US006907928B2

United States Patent
Di Lullo Arias et al.

(10) Patent No.: US 6,907,928 B2
(45) Date of Patent: Jun. 21, 2005

(54) STORABLE CEMENTITIOUS SLURRIES CONTAINING BORIC ACID AND METHOD OF USING THE SAME

(75) Inventors: Gino F. Di Lullo Arias, Rio de Janeiro (BR); Philip James Rae, Singapore (MY)

(73) Assignee: BJ Services Company, Houston, TX (US)

( * ) Notice: Subject to any disclaimer, the term of this patent is extended or adjusted under 35 U.S.C. 154(b) by 119 days.

(21) Appl. No.: 10/629,968

(22) Filed: Jul. 30, 2003

(65) Prior Publication Data

US 2005/0022992 A1 Feb. 3, 2005

(51) Int. Cl.$^7$ .............................................. E21B 33/13
(52) U.S. Cl. ...................... 166/292; 166/293; 106/789; 106/790
(58) Field of Search ................................ 166/285, 292, 166/293; 106/789, 790, 791

(56) References Cited

U.S. PATENT DOCUMENTS

| | | | |
|---|---|---|---|
| 4,137,093 A | | 1/1979 | Poblano |
| 4,455,171 A | * | 6/1984 | Spensley et al. ............. 106/694 |
| 4,676,832 A | | 6/1987 | Childs et al. |
| 5,447,197 A | | 9/1995 | Rae et al. |
| 5,488,991 A | * | 2/1996 | Cowan et al. ............... 166/293 |
| 5,547,506 A | | 8/1996 | Rae et al. |
| 6,173,778 B1 | | 1/2001 | Rae et al. |
| 6,613,142 B1 | * | 9/2003 | D'Almeida et al. ......... 106/789 |
| 6,626,242 B2 | * | 9/2003 | D'Almeida et al. ......... 166/292 |

OTHER PUBLICATIONS

WPI Abstract No. 1996–351301.
WPI Abstract No. 1989–003162.

* cited by examiner

*Primary Examiner*—Frank Tsay
(74) *Attorney, Agent, or Firm*—Locke Liddell & Sapp LLP; John Wilson Jones

(57) ABSTRACT

A storable, hydraulically-active, cementitious slurry is made and used to cement within subterranean foundations for oil and gas wells. The slurry is made from a hydraulically-active cementitious material, a suspending agent, and, as a retarder, boric acid. The boric acid is present in the cementitious slurry in an amount sufficient to lower the pH of the storable cementitious slurry to at least 12.0, preferably to at least 11.0 or preferably, for reasons of longevity, to a pH of at least 9.0. Generally the amount of boric acid in the cementitious slurry is between from about 1 to about 6 percent by weight. Preferred as suspending agent are iota carrageenan as well as poly (methyl vinyl ether/maleic anhydride) decadiene copolymer. The slurry remains liquid during storage. The slurry is activated when needed for cementing and is pumped into the subterranean formation where it is allowed to set.

39 Claims, 4 Drawing Sheets

STORABLE CEMENTITIOUS SLURRIES CONTAINING BORIC ACID AND METHOD OF USING THE SAME

FIELD OF THE INVENTION

The present invention relates to storable cementitious slurries used for oil and gas well cementing containing boric acid, as well as a method of cementing an oil or gas well using the storable slurry.

BACKGROUND OF THE INVENTION

Hydraulic cements are cements that set and develop compressive strength due to a hydration reaction, and thus can be set under water. As such, hydraulic cements are often used for cementing pipes or casings within a well bore of a subterranean formation for the construction of oil, gas and water wells, as well as other purposes, such as squeeze cementing. In the oil and gas industry, successful cementing of well pipe and casing during oil and gas well completion requires cement slurries having several important properties. The cement slurry must have a pumpable viscosity, fluid loss control, minimized settling of particles and the ability to set within a practical time.

In a typical completion operation, the cement slurry is pumped down the inside of the pipe or casing and back up the outside of the pipe or casing through the annular space. This seals the subterranean zones in the formation and supports the casing. Conventional mixing equipment for such applications is relatively complex and expensive. The equipment must wet dry cement powder, homogenize the mix, measure its density and, if necessary, recirculate it, such that additional solids or mixwater can be added to achieve the desired density. These varied requirements dictate the equipment's configuration and complexity.

Bulk equipment is usually pressurized so that solids can be transferred pneumatically at the relatively high rates required. Once at the drilling site, the pneumatically conveyed cementing solids must be correctly proportioned and mixed with the water, as well as other additives to form a pumpable slurry. The slurry must then be tested for the appropriate density, with the density adjusted to fall within the appropriate range. If cementing solids are not correctly proportioned, the quality of the cement diminishes.

U.S. Pat. Nos. 5,447,197 and 5,547,506 disclose storable cementitious slurries that remain liquid over an extended period of time and which can be activated at the time of use to meet specific job requirements. Such slurries contain, in addition to the cementitious slurry, a set retarder and a suspending agent. In U.S. Pat. No. 6,173,778 a carrageenan suspending agent is employed to provide a slurry under conditions of high pH and calcium ion content. Such cementitious slurries offer several advantages over the conventional cementing slurries of the prior art. Most notably, they be made in advance and stored until needed, thereby allowing the production of such slurries regardless if drilling has commenced. In addition, the storable cement slurry may be made at a different location from the job site. This storable slurry can then be transported to the job site before cementing. Further, the slurry can be stored in nonpressurized tanks and easily transferred. Still further, the mixing equipment used on the job site need only homogenize the slurry with any additional water and additives as required en route to the down hole pumps; activators may be added, mix water proportioned and additives introduced on-site to control the slurry's properties. Such storable slurries can further undergo quality control prior to introduction into the well. In addition, the need for sophisticated density control equipment is eliminated, thereby reducing the capital investment requirement for cementing equipment.

Unfortunately, such storable slurries are often difficult to apply universally due to variable cement quality, the need to use good quality mixwater and the lack of suitable quality control methodology to track the evolution of the slurry versus time after preparation. Such obstacles require great care and attention to detail. Storable slurries, which provide an easily measurable parameter, which accurately predicts the evolution of the storable slurry and its propensity to set, are therefore desired. In addition, it is desired that such cementitious slurries provide suspension stability and less tendency to exhibit particle sedimentation than the slurries of the prior art.

SUMMARY OF THE INVENTION

The storable, hydraulically-active, cementitious slurry of the invention is suitable for cementing within subterranean formations for oil or gas wells. The storable slurry comprises a hydraulically-active cementitious material of a type suitable for cementing within subterranean formations for oil or gas wells and an effective amount of set retarder to allow the storage of the slurry with a minimal change of the slurry's set characteristics after activation and to allow the reversal of the retardation after adding an effective amount of an activator to the slurry prior to cementing.

The set retarder is boric acid and is present in the cementitious slurry in an amount sufficient to lower the pH of the storable cementitious slurry to be less than or equal to 12.0, preferably less than or equal to 11.0, in fact, preferably, to a pH less than or equal to 9.0. The boric acid may be present in the cementitious slurry in an amount sufficient to lower the pH of the storable cementitious slurry to as low as 6.0. Generally the amount of boric acid in the cementitious slurry is between from about 1 to about 6 percent by weight of the cementitious material (BWOC).

The storable cementitious slurry of the invention further contains a suspending agent for maintaining the slurry with minimal separation of the cementitious material. Preferred as suspending agent are iota carrageenan and poly (methyl vinyl ether/maleic anhydride) decadiene copolymer.

The slurry remains liquid during storage. The slurry is activated when needed for cementing and is pumped into the subterranean formation where it is allowed to set.

In one method of the invention, a subterranean formation for an oil or gas well is cemented with the storable, hydraulically-active, cementitious slurry formulated by mixing together the storable cementitious slurry and an activator, which is then pumped into the subterranean formation and allowed to set. The steps of the method are preferably performed at two different locations, i.e., the stable, hydraulically-active, cementitious slurry is formulated at one location and then, when desired to be used, is transferred to a second location where it is activated. The mixture is then pumped into the subterranean formation for cementing.

BRIEF DESCRIPTION OF THE DRAWINGS

In FIGS. 1 and 2 the activator is dibasic potassium phosphate and in FIGS. 3 and 4, the activator is KF.

DETAILED DESCRIPTION OF THE PREFERRED EMBODIMENTS

Figure 1:
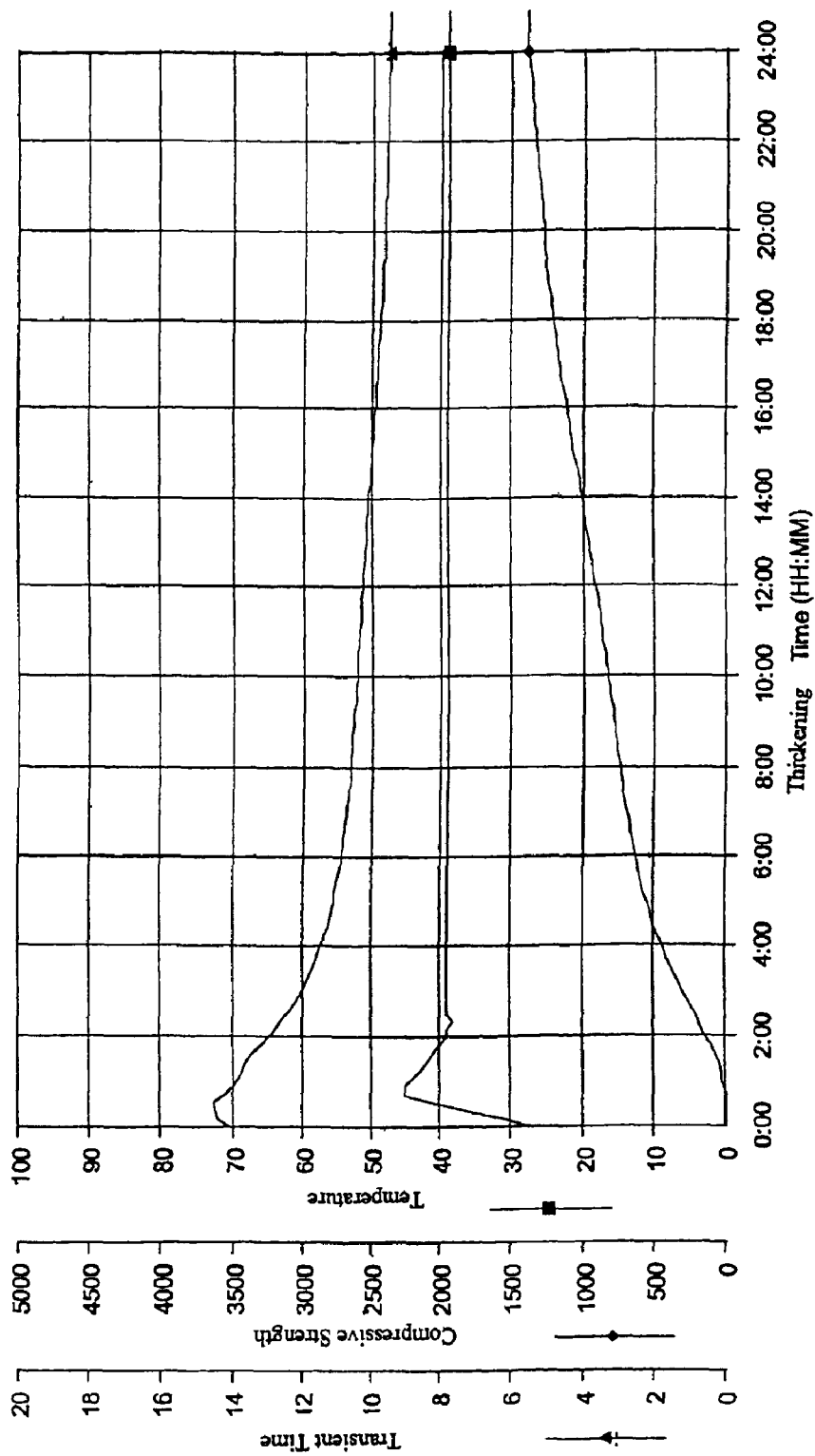
FIGS. 1–4 illustrate the compressive strength of the compositions at various temperatures after storage and re-activation.

The storable, hydraulically-active, cementitious slurry of the invention is suitable for cementing within subterranean formations for oil or gas wells. The cementitious slurry contains a hydraulically-active cementitious material, a suspending agent and boric acid as a retarder.

Hydraulically-active cementitious materials, suitable for use in the cementitious slurry, include materials with hydraulic properties, such as hydraulic cement, slag and blends of hydraulic cement and slag (slagment), which are well known in the art. The term "hydraulic cement" refers to any inorganic cement that hardens or sets due to hydration. As used herein, the term "hydraulically-active" refers to properties of a cementitious material that allow the material to set in a manner like hydraulic cement, either with or without additional activation. Hydraulically-active cementitious materials may also have minor amounts of extenders such as bentonite, gilsonite, and cementitious materials used either without any appreciable sand or aggregate material or admixed with a granular filling material such as sand, ground limestone, the like. Strength enhancers such as silica powder or silica flour can be employed as well. Hydraulic cements, for instance, include Portland cements, aluminous cements, pozzolan cements, fly ash cements, and the like. Thus, for example, any of the oilwell type cements of the class "A-H" as listed in the API Spec 10, (1st ed., 1982), are suitable hydraulic cements. In addition, the cementitious material may include silica sand/flour and/or weighing agents including hematite or barite.

Slagment and Portland cement are preferred cementitious materials. However, both of these materials react quickly with water and set at room temperature unless modified, and they are, therefore, much more difficult to control. The interstitial water of both cement and slagment slurries is also very aggressive, for example, having a high pH. Yet, storable slurries formed from hydraulic cement, especially Portland cement, or slagment have the best overall performance characteristics for well cementing applications.

Under normal conditions, the storable slurries of the invention have considerable longevity. The storable slurry of the invention should remain stable as a liquid, preferably for about 7 to about 25 days and more preferably about two to three months without setting, depending on the type of cement and concentration of boric acid used. In some cases, storage times in excess of six months will be achieved. Changes in thickening time of the activated hydraulic cement slurries, even after prolonged storage of the nonactivated slurry, are not excessive and such changes are readily determined using techniques known in the art.

Boric acid functions as the set retarder in the cementitious slurry of the invention. The boric acid serves to inhibit the hydration process, thereby preventing the cementitious material from setting. Normally, when cementitious material is added to water, the dissolution of the cementitious material and free alkalis causes the pH of the water to rise; often to a pH as high as 12.0 or 13.0. With about 25 lbs. of lime produced by one sack of cementitious material, it would require a huge amount of acid to neutralize this alkalinity. In addition, such an approach would irreversibly compromise the properties of the cementitious material. It has been discovered that an effective amount of boric acid allows the storage of the slurries at lower pH's. In fact, the addition of small amounts of very weak boric acid causes the pH of the interstitial water to drop to as low as 6.0. The pH of the cementitious slurry remains low for a prolonged period of time. When the pH rises rapidly, to for instance a pH of 10.0, hydration has likely recommenced. Under some circumstances, if left alone the cementitious slurry settle in less than 48 hours. If desired, additional boric acid may be added at this juncture, causing the pH to fall again and the cement to remain fluid for some additional days.

Further, as the cementitious slurry ages and its pH rises, the suspension stability of the slurry declines, especially in those slurries where the poly (methyl vinyl ether/maleic anhydride) decadiene copolymer is used as the suspending agent. This is another indication that the slurry is nearing the end of its storage life or that it must be retarded anew by the addition of more boric acid.

It is equally important that this retarding effect, for long term storage, be reversible after adding an effective amount or low concentration of activator to the slurry, even at low well circulating temperatures. In addition, the set retarder should preferably provide some dispersion of the slurry without over dispersion, and little effect on the compressive strength after activation and setting.

The boric acid is present in the cementitious slurry in an amount sufficient to lower the pH of the storable cementitious slurry to be less than or equal to 12.0, preferably less than or equal to 11.0, more preferably to be less than or equal to 10.0, even more preferably to be less than or equal to 9.0, most preferably to be less than or equal to 8.0, even most preferably to be less than or equal to 7.0. The boric acid may be present in the cementitious slurry in an amount sufficient to lower the pH of the storable cementitious slurry to as low as 6.0. Generally the amount of boric acid in the cementitious slurry is between from about 1 to about 6 percent by weight (BWOC). The amount of boric acid in the cementitious slurry may be dependent on the desired storage time and the specific reactivity of the cementitious system being retarded.

Because the cementitious material may separate during storage due to reduced interparticle interactions when compared with normal cement slurries, adding a suspending/thixotropic agent maintains the slurry with minimal separation of the cementitious material. Certain types of suspending agents of the type used in the drilling mud industry can be used for the purposes of the present invention. These suspending agents include polymers, clays, emulsions, transition metal oxides and hydroxides, and the like.

Suitable suspending/thixotropic agents include welan gum, xanthan gum, cellulose, polyanionic cellulose, xanthan gums, cellulose and derivatives such as carboxymethyl-hydroxyethyl-cellulose, guar and its derivatives, starch and polysaccharides, succinoglycan, polyethylene oxide, bentonite, attapulgite, mixed metal hydroxides, clays such as bentonite and attapulgite, mixed metal hydroxides, oil in water emulsions created with paraffin oil and stabilized with ethoxylated surfactants, poly (methyl vinyl ether/maleic anhydride) decadiene copolymer etc.

Specific examples of suspending agents useful for the purposes of the present invention include such polysaccharides as welan gums "BIOZAN", Kelco, San Diego, Calif., polyanionic cellulose "DRISPAC", Drilling Specialties, Bartlesville, Okla., succinoglycan "SHELLFLO-S", Shell International Chemical Co., Ltd., London, England; polyethylene oxide "POLYOX PEO"; and mixed metal hydroxides "POLYVIS", SKW, Trostberg, Germany.

Preferred as suspending/thixotropic agents are carrageenans or carrageenan gums which offer high stability and resistance to the harsh chemical environment, particularly when Portland cement is used. Carrageenans, or carrageenan gums, are typically derived from seaweed and are ionic linear polysaccharides comprising repeating galactose units which individually may be sulfated or unsulfated. Specific carrageenan types include kappa, iota and lambda carrageenans. Mixtures of carrageenan types are also possible. Properties of individual carrageenan types primarily depend on the number and position of sulfate groups on the repeating galactose units. In the presence of excess cations, kappa and iota carrageenans form gels. Cations that may be associated with carrageenan sulfate groups include, but are not limited to, ammonium, calcium, magnesium, potassium, and sodium cations.

In the practice of the disclosed method and compositions, any carrageenan or carrageenan-like material suitable for forming a gel (including thixotropic gels) and/or otherwise acting as a suspending agent may be employed. Suitable carrageenans include those disclosed in U.S. Pat. No. 6,173,778, herein incorporated by reference.

Iota carrageenan is especially preferred. An iota carrageenan typically comprises about 30% 3, 6 anhydrogalactose and about 32% ester sulfate. However, any other form of iota carrageenan or variant or modification thereof may also be employed. Iota carrageenan is typically employed in environments containing cations of calcium, potassium, magnesium, etc. Most typically, a divalent cation is employed with iota-carrageenan. A specific example of a suitable iota carrageenan composition for use in the disclosed method is commercially available as "VISCARIN SD-389" available from FMC Food Ingredients Division. This product is also known as "LSS-1" from BJ Services Company. Other iota carrageenan examples include "GELCARIN GP-359," "GELCARIN GP-379," and "SEASPEN IN" (which also contains phosphates and $CaSO_4 2H_2O$), also available from FMC Food Ingredients Division. In addition to these carrageenans, other suitable commercially available carrageenan compositions include, but are not limited to, carrageenan materials available from FMC Europe NV of Brussels Belgium; Chemcolloids Ltd. of Bosley, UK; Aqualon, Reigate, Surrey, UK; and Ashland Chemical Company, Dublin, Ohio.

In the practice of the disclosed method, a carrageenan is typically hydrated prior to addition to or combination with other components of a storable cement slurry. In this regard, some iota carrageenan materials may require heating to above the solubility temperature to achieve hydration, for example to about 80° C. In other cases, an iota carrageenan material may be hydrated without prior heating in the present of sodium ions.

An even more preferred suspending agent is the synthetic polymer, poly (methyl vinyl ether/maleic anhydride) decadiene copolymer, a product commercially sold as Stabileze QM by International Specialty Products, Inc. of Wayne, N.J. This suspending agent exhibits exceptional suspending capabilities below a pH of 9.0. The combination of boric acid and poly (methyl vinyl ether/maleic anhydride) decadiene copolymer are especially suitable since the boric acid is capable of placing the pH of the cementitious slurry in an appropriate range for the suspending capabilities of the poly (methyl vinyl ether/maleic anhydride) decadiene copolymer.

Especially preferred results are obtained when the suspending agent is a liquid comprising about 6 percent by weight poly (methyl vinyl ether/maleic anhydride) decadiene copolymer, 18% by weight butyl alcohol, 76 percent by weight of water and about 0.02 percent by weight of formaldehyde. Such materials will hydrate almost immediately in fresh water after the pH of the solution is adjusted between 5.0 and 8.0, thereby producing a gel with excellent solid support at concentrations higher than 25 gal/1,000 gallons of water. Use of this suspending agent with boric acid renders a near neutral pH for the cementitious slurry. Further, it is often unnecessary to further adjust the pH as the combination of cementitious material and boric acid fulfills this objective. When used in combination with 3 to 4 percent (BWOC) of boric acid, the pH of the cementitious slurry is approximately 8.5 and the cementitious slurry may be stored for 6 days, or longer, depending on the reactivity of the cementitious material. For longer storage times, the amount of boric acid may be increased.

Because more than one suspending agent can be used in the storable slurry, the term "suspending agent" may refer to more than one suspending agent. The amount of suspending agent used in the storable slurry depends on the type of hydraulically-active cementitious material and selected suspending agent. For slag, the amount of xanthan gum preferably ranges from 0.1 to about 2 pounds per barrel (ppb) with the bentonite ranging from 0.1 to about 8 ppb, with about 0.66 of xanthan gum and 0.1 to about 3 ppb of bentonite especially preferred. For hydraulic cement and slagment, the amount of "SHELLFLO-S." preferably ranges from 0.1 to about 0.4 gpb based on the amount of the mixwater, with about 0.1 gpb to about 0.2 gpb preferred, and bentonite ranges from 0 to about 10 ppb, with 0.1 to about 3 ppb preferred. If polyethylene oxide is used alone, the amount preferably ranges from 0 to about 5 ppb with about 0.5 ppb to about 2 ppb especially preferred. If iota carrageenan is employed, the amount preferably ranges from 0.1 to about 2.0 ppb.

An optional dispersing agent may be used in the storable slurry to control the fluidity of the slurry. The amount of dispersing agent depends of the type of hydraulically-active cementitious material used, selected suspending agent and desired density of the storable slurry. Dispersants, such as polyacrylate, sulfonated styrene maleic anhydride, naphthalene sulfonic acid polymer, and the like, are well known in the art and can be added to the mixture as needed. Specific examples of dispersing agents further include melamine sulfonic acid polymer condensation product "SP5", "CORMIX", Warrington, England, sodium polyacrylate "BEVALOID 6770", Rhone-Poulenc, Watford, England, naphthalene sulfonic acid polymer "LOMARD", Diamond Shamrock Chemicals Co., Morristown, N.J., and sulfonated-styrene maleic anhydride polymer "SSMA", Miltemp, Milpark, Houston, Tex. The preferred dispersing agent is sodium polyacrylate. Typically, the amount of dispersing agent employed ranges from 0 to about 5 pounds per barrel of mix water, with about 1 to about 3 pounds per barrel preferred.

Mixing water containing the above-mentioned additives with the dry hydraulically-active cementitious materials produces the storable slurry. A sufficient amount of water, preferably fresh water, should be added to the hydraulically-active cementitious material to form a liquid storable slurry of suitable consistency. A storable slurry with Portland cement should have a density measuring in the range from about 11 to 17.5 lbm/gal and preferably in the range of about 14 to 17.5 lbm/gal, more preferably about 15–16.5 lbm/gal. Storable Portland cement slurries at densities about 17.5 lbm/gal and greater have a tendency to gel or undergo a type of "pack-setting" when stored for prolonged periods. Slurry densities for slag slurries of about 15 lbm/gal are preferable.

Depending upon the particular storable slurry, the amount of mixing water in the slurry of the present invention ranges from about 30 to 150 weight percent based upon the dry weight of cement and preferably is in the range of about 35 to 90 weight percent.

At the time of cementing, the stored slurry is activated, pumped into the well and allowed to set. Activation occurs by adding an activator. The activator initiates hydration and allows the slurry to set after a predetermined pumping time. The initiation of hydration is further accompanied by an increase in the interstitial pH. The activator must counteract the set retarder while having a minimal effect on final slurry properties or set characteristics, such as rheology and fluid loss when used in an effective amount. In addition, the activator should be easy to pump and handle, such as a liquid; be widely available at reasonable purity; and be safe to ship and handle along with being environmentally acceptable.

Activators and activation methods as described in U.S. Pat. Nos. 5,447,197 and 5,547,506 may be employed, including "over-activation." Activators are typically added just prior to use of a storable cement slurry. Typical activators include, but are not limited to, solutions of Group IA and IIA hydroxides, such as sodium hydroxide, magnesium hydroxide and calcium hydroxide; Group IA halides, such as sodium fluoride and KF; ammonium halides, such as ammonium fluoride and ammonium bifluoride (ABF); sulfates, such as sodium sulfate; aluminates, such as sodium aluminate and potassium aluminate; carbonates, such as alkali carbonates, like sodium carbonate; phosphates, such as dibasic alkali phosphates (like dibasic potassium phosphate) and tribasic alkali phosphates (like tribasic potassium phosphate); ammonium phosphates, such as tribasic ammonium phosphate and dibasic ammonium phosphate; silicates; and amines (such as triethanolamine ("TEA"), diethanolamine, etc. Most typical activators are alkali silicates, such as sodium silicates. For slag slurries a sodium silicate "Crystal 120H", Crosfield, Warrington, England, with a particular silica/soda ratio is especially preferred. Sodium silicate ("Crystal 100S", Crosfield) with a different silica/soda ratio is especially preferred for hydraulic cement and slagment slurries.

Typical concentrations of activator range from 0 to about 8 gallons per barrel ("GPB") of slurry, typically about 1 to about 3 GPB of slurry and are typically added with mix water.

Extra water is preferably added to the storable slurry during activation. This extra water may be fresh water, sea water or brine. The extra water may contain activator and additional additives, for instance, potassium chloride, dispersants, viscosifiers, liquid suspensions of weighting agents and chemical extending agents.

The activated slurry can be adjusted to the desired density for a particular cementing application. The slurry density can be increased by the addition of a liquid suspension of a weighting agent, such as trimanganese tetraoxide. Lower density slurries can be prepared by adding more water and modifying activator concentrations, if required. Thus, storable slurry "concentrates" can be made in advance and diluted when activated. For example, a 12.5 lbm/gal Portland cement slurry can be prepared by adding 2–3 gallons sodium silicate activator per bbl of slurry and around 38 gallons of additional water per bbl to a storable slurry having the initial density around 15.8 to 16.5 lbm/gal.

Preferably, a pumpable slurry is formed with a measured density ranging from about 11 to about 20 lbm/gal, more preferably in the range of about 14 to about 16 lbm/gal and most preferably about 15 lbm/gal. Although the latter is a lower density than conventional "neat cement", the mechanical properties of the set cement are appropriate for well cementing applications. Furthermore, the volume yield increases and the rheology improves by this slight density reduction.

Once set, the storable slurries of the invention have normal levels of compressive strength. The resultant slurry can be kept with occasional agitation for periods of time exceeding twelve weeks under normal storage conditions.

Fluid loss control is essential for many conventional cementing applications, for example, squeeze cementing and the cementing of liners and production strings. The addition of conventional cementing fluid-loss additives, such as polyvinyl alcohol, styrene-butadiene latex, co- and ter-polymers of acrylamidomethylpropanesulfonic acid, hydroxyethyl cellulose, carboxymethyl hydroxyethyl cellulose, carboxymethyl cellulose and starch, to storable hydraulic cement and slagment slurries, at the time of activation, provides acceptable levels of control.

A number of additional factors may affect the performance of the storable slurries of the invention. Conventional cement slurries, under certain circumstances, are sensitive to shear and exhibit changes in rheology and thickening time, for example, that depend on the mixing energy or pipe shear to which they are exposed. The storable slurries of the invention do not exhibit undue shear sensitivity and, therefore, should be mixable with a variety of field equipment.

The storable slurry of the invention offers the option of adding material either to the slurry itself or to extra mixwater used to dilute the slurry to the final design density. It is well known that the response of cements to certain additives, for example, dispersants, retarders and gelling agents depends on how the additives are introduced to the slurry. Dry blended additives often elicit qualitatively different performance characteristics than those added to mixwater. Even greater differences are sometimes seen if additives are added to an already-mixed slurry. The order of addition of activator and additional additives to the slurry has little effect on the rheology of the activated slurry when mixed at normal API shear rates. The slurries of the invention are stable and can be stored for long periods of time while yielding excellent compressive strengths. Because these stable slurries do not set immediately, they can be made at one site and transferred to another site. For example, the slurries can be formulated at one location, such as on land, with the density of the slurry measured and adjusted if desired. Next, the formulated slurry is transferred to a second location, such as an offshore rig. At the second location the transferred slurry may be immediately activated or stored until needed and subsequently activated. At the time of activation, additional mix water and additives are added, while the slurry's density is adjusted to a desired density. The activated slurry is then pumped into the wellbore for the purpose of supporting the casing and isolating subterranean formations.

The ability to store the liquid cement slurry of the invention eliminates onsite mixing problems, particularly the control of slurry density. Proportioning a liquid slurry with liquids, such as extra water or a weighting agent, is far simpler than proportioning bulk solids with water.

Simpler equipment can be used with the storable slurries of the invention. The slurries can be kept in nonpressurized tanks and loaded and unloaded with conventional fluid pumps. When cementing, the mixing unit need do no more than homogenize the fluid streams of the slurry plus additional mixwater and liquid additives en route to the downhole pumps.

The ability to prepare and control the quality of a storable slurry at the base is obviously advantageous. The slurry is mixed and its initial density measured and adjusted at the base rather than at the wellsite. The slurry need only be homogenized and activated during the cementing operation. The stability of the slurry and long-term fluidity allow the slurry to be prepared, transferred and stored a considerable time before needed for wellsite operations. Thus, the slurry may be prepared at a central facility and stored in liquid form at the facility. From there it is loaded aboard trucks or workboats and transferred to the remote wellsite. At the wellsite, it may be offloaded and stored or used immediately for cementing operations.

The slurry can be transferred with centrifugal pumps between storage tanks, transport tanks and downhole pumps much faster than dry cement can be transferred pneumatically. Similarly, the time to offload cargo to an offshore location would be reduced. For land locations, the slurry could be prepared at the rigsite while drilling is in progress or at a central facility and truck to the wellsite, days before the cementing operation and stored until needed.

The activated slurry can be easily modified to be used for a wide variety of cementing purposes desirable in oil and gas well cementing applications. A few example of these properties include gas control, fluid loss control, turbulent flow rheology and high early strength.

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

All percentages expressed herein, unless indicated to the contrary, refer to weight percentages.

EXAMPLES

Storable cementitious slurries were made using Portland cement "Dyckerhoff Class G" (Dyckerhoff Zementwerke, Wiesbaden, Germany) as the cementitious material. Approximately 600 g of cement was mixed with boric acid (3 to 6% BWOC) as set retarder, sodium polyacrylate dispersant plasticizer ("LSP-1") (between from about 0.05 to about 0.25 per cubic feet of slurry (gpc)) and poly (methyl vinyl ether/maleic anhydride) decadiene copolymer ("Stabileze Gel" or "S. GEL") as suspending agent at room temperature. The resultant slurries were kept with occasional agitation.

Viscosity was measured using a Fann 35 rheometer at the indicated RPM, e.g., $L_{600}$ refers to the viscosity reading at 600 RPM. The amount of water floating, in g, on top of the cement was also measured in terms of two indicia, $H_2O$ Free Dynamic and Static. The slurry was divided into two equal portions. The static test was the sample slurry that was mixed only once and left standing during the testing period. The dynamic measurement was the water appearance tested daily before re-mixing the slurry for rheology testing. "Bleed water" refers to the supernatant fluid which may form on the surface of a cement slurry after it has remained static for some time.

Table I, below, summarizes the life, in days, of each of the formulations.

TABLE I

| Example | FORMULATION | pH | $L_{600}$ | $L_{300}$ | $L_{200}$ | $L_{100}$ | $L_6$ | $L_3$ | $H_2O$ Free Dynamic/Static | LIFE-DAYS |
|---|---|---|---|---|---|---|---|---|---|---|
| 1 | LSP-1: 0.05 gpc + |  | 160 | 98 | 78 | 54 | 21 | 17 | 1.4 | 01 |
|  | Boric 3% |  | 210 | 139 | 113 | 79 | 24 | 17 | 1.8 | 02 |
|  | S.GEL: 0.2% |  | 248 | 159 | 130 | 89 | 26 | 18 | 1.8 | 03 |
|  |  |  | >300 | 209 | 168 | 115 | 29 | 19 | 1.4 | 05 |
|  |  |  | >300 | >300 | 247 | 123 | 26 | 17 | 1.5 | 06 |
|  |  |  |  |  | SET |  |  |  |  | 07 |
| 2 | LSP-1: 0.15 gpc + | 8.25 | 145 | 75 | 57 | 40 | 17 | 14 | — | 01 |
|  | Boric: 3% | 8.94 | 192 | 117 | 91 | 62 | 20 | 15 | 2.4/1.95 | 02 |
|  | S.GEL: 0.15% | 11.15 | 245 | 159 | 130 | 91 | 26 | 17 | 3.5/3.25 | 03 |
|  |  |  |  |  | SET |  |  |  |  | 04 |
| 3 | LSP-1: 0.2 gpc + | 9.69 | 137 | 68 | 56 | 34 | 16 | 14 | — | 01 |
|  | Boric: 3% | 12.06 | 195 | 117 | 95 | 69 | 28 | 18 | 2/1.95 | 02 |
|  | S.GEL: 0.15% |  |  |  | SET |  |  |  |  | 03 |
| 4 | LSP-1: 0.2 gpc + | 7.7 | 149 | 80 | 65 | 43 | 18 | 16 | — | 01 |
|  | Boric: 4% | 8.76 | 213 | 138 | 111 | 75 | 24 | 19 | 1.9/0.65 | 02 |
|  | S.GEL: 0.15% | 8.98 | 246 | 151 | 121 | 82 | 24 | 18 | 5/2.8 | 03 |
|  |  | 9.5 | 256 | 158 | 125 | 86 | 26 | 19 | 5/3 | 05 |
|  |  | 10.8 | 282 | 170 | 137 | 94 | 27 | 19 | 6/2.25 | 08 |
|  |  | 10.97 | 291 | 169 | 137 | 94 | 28 | 20 | 8/4.6 | 07 |
|  |  |  |  |  | SET |  |  |  | 7.5/4.25 | 08 |
| 5 | LSP-1: 0.2 gpc + | 7.35 | 154 | 80 | 76 | 51 | 21 | 19 | — | 01 |
|  | Boric: 5% | 8.02 | 275 | 173 | 141 | 95 | 28 | 21 | 0.9/0.9 | 02 |
|  | S.GEL: 0.15% | 8.4 | >300 | 212 | 171 | 115 | 30 | 24 | 1.3/3 | 03 |
|  |  | 8.7 | >300 | 226 | 179 | 123 | 32 | 24 | 1.6/1.25 | 04 |
|  |  | 9.0 | >300 | 240 | 193 | 131 | 34 | 24 | 1.8/1.45 | 06 |
|  |  | 9.0 | >300 | 253 | 201 | 134 | 35 | 27 | 2.1/2.4 | 07 |
|  |  | 9.0 | >300 | 256 | 202 | 136 | 36 | 26 | 2.2/3.1 | 08 |
|  |  | 9.63 | >300 | 287 | 229 | 154 | 39 | 28 | 2.8/3.53 | 09 |
|  |  | 10.45 | >300 | >300 | 240 | 164 | 43 | 31 | 3.4/1.2 | 10 |
|  |  |  |  |  | SET |  |  |  | 4.0/1.2 | 13 |
| 6 | LSP-1: 0.2 gpc + | 6.85 | 184 | 108 | 82 | 56 | 23 | 20 | — | 01 |
|  | Boric: 6% | 7.6 | >300 | 225 | 176 | 117 | 30 | 23 | 0.3/0.38 | 02 |
|  | S.GEL: 0.15% | 8.4 | >300 | 212 | 171 | 115 | 30 | 24 | 1.3/3 | 03 |

TABLE I-continued

| Example | FORMULATION | pH | $L_{600}$ | $L_{300}$ | $L_{200}$ | $L_{100}$ | $L_6$ | $L_3$ | $H_2O$ Free Dynamic/Static | LIFE-DAYS |
|---|---|---|---|---|---|---|---|---|---|---|
| | | 8.25 | >300 | >300 | 248 | 158 | 35 | 26 | 0.75/0.5 | 04 |
| | | 8.46 | >300 | >300 | 243 | 152 | 42 | 33 | 0.6/0.7 | 06 |
| | | 8.45 | >300 | >300 | 247 | 156 | 44 | 34 | 0.7/0.68 | 07 |
| | | 8.58 | >300 | >300 | >300 | 166 | 38 | 33 | 0.9/1.1 | 08 |
| | | 8.65 | >300 | >300 | >300 | 169 | 41 | 35 | 1.1/1.93 | 09 |
| | | 8.9 | >300 | >300 | 280 | 174 | 47 | 37 | 1/0.53 | 10 |
| | | 9.3 | Not Enough Volume to Perform Rheology Test | | | | | | 1.5/0.6 | 11 |
| | | 10.1 | | | SET | | | | 2/0.9 | 12 |
| 7 | LSP-1: 0.25 gpc + | 8.38 | 141 | 70 | 60 | 39 | 20 | 17 | — | 01 |
| | Boric: 4% | 9.4 | 188 | 118 | 97 | 69 | 29 | 20 | 0.8/0.65 | 02 |
| | S.GEL: 0.15% | 11.66 | 200 | 150 | 126 | 94 | 36 | 25 | 1.3/2.15 | 03 |
| | | 13.10 | 186 | 146 | 125 | 91 | 35 | 24 | 2.1/2.6 | 05 |
| | | | | | SET | | | | 2.5/0.53 | 06 |
| 8 | LSP-1: 0.25 gpc + | 8.25 | 146 | 81 | 65 | 42 | 20 | 17 | | 01 |
| | Boric: 4% | | | | | | | | | |
| 8 | S.GEL: 0.15% | 10.1 | 194 | 127 | 100 | 70 | 29 | 20 | 1.2/0.45 | 02 |
| 8 | | 11.9 | 244 | 168 | 127 | 94 | 37 | 28 | 1.6/0.95 | 04 |
| 9 | Test 8 + 0.5% Boric | 12.14 | 212 | 185 | 159 | 121 | 42 | 28 | | 04 |
| | | | | | SET | | | | 0.9/0.46 | 05 |
| 10 | Test 8 + 1.0% Boric | 9.6 | 171 | 139 | 123 | 99 | 43 | 34 | | 04 |
| | | | | | SET | | | | 0.95/1 | 05 |
| 11 | LSP-1: 0.25 gpc + | 7.78 | 143 | 80 | 58 | 39 | 20 | 18 | | 01 |
| | Boric: 4% | 11.77 | 242 | 165 | 126 | 94 | 38 | 29 | 1.8/2.4 | 04 |
| | S.GEL: 0.15% | | | | | | | | | |
| | | | | | SET | | | | | 05 |
| 12 | Test 11 + | 7.8 | 141 | 114 | 99 | 83 | 48 | 41 | | 01 |
| | 3% Boric: | 8.4 | 190 | 158 | 140 | 112 | 54 | 42 | 0.2/0.06 | 02 |
| | | 8.48 | 215 | 180 | 159 | 126 | 55 | 43 | 0.25/0.33 | 03 |
| | | 8.71 | 250 | 194 | 164 | 127 | 60 | 47 | 0.25/0.13 | 04 |
| 12 | LSP-1: 0.15 gpc + | 8.00 | 225 | 126 | 90 | 53 | 10 | 8 | | 01 |
| | Boric: 3% | 8.70 | 251 | 140 | 100 | 56 | 7 | 5 | 0/0 | 02 |
| | LSS-1: 0.2% | 9.00 | 255 | 145 | 102 | 57 | 8 | 6 | 2.5/5 | 03 |
| | | 9.25 | 252 | 138 | 97 | 54 | 7 | 5 | 4.5/4.5 | 04 |
| | | 9.39 | 249 | 136 | 94 | 52 | 6 | 4 | 8.3/10 | 05 |
| | | 9.70 | 251 | 138 | 96 | 52 | 6 | 4 | 16.50/4.25 | 07 |
| | | 10.24 | 252 | 132 | 93 | 51 | 6 | 4 | 18/10.75 | 08 |
| | | 11.0 | | | Set | | | | | |
| 13 | LSP-1: 0.15 gpc + | 7.85 | 286 | 176 | 131 | 81 | 16 | 12 | | 01 |
| | Boric: 3% | 8.70 | >300 | 208 | 155 | 94 | 14 | 10 | 0/0 | 02 |
| | LSS-1: 0.3% | 9.0 | >300 | 216 | 153 | 93 | 14 | 10 | 0/0.9 | 03 |
| | | 9.12 | >300 | 214 | 152 | 90 | 13 | 9 | 0.5/1 | 04 |
| | | 9.32 | >300 | 206 | 147 | 86 | 12 | 8 | 5/1.8 | 05 |
| | | 9.48 | >300 | 201 | 145 | 85 | 11 | 7 | 6/8.5 | 07 |
| | | 9.55 | >300 | 201 | 144 | 84 | 11 | 7 | 10.7/12.5 | 08 |
| | | 10.6 | >300 | 207 | 150 | 87 | 11 | 7 | 12.3/9.25 | |
| | | | | | Set | | | | | |

The results show a delay in cement setting while keeping a workable slurry. The formulation providing the best results employed 0.25 gpc LSP-1+0.15 gpc Stabileze Gel+4% Boric Acid (see Example 7). This formulation provided 6 days life with very low bleed water. When the pH of the slurry was increased above 10.0, it set in less than 48 hours; the bleed water further increased to over 2% due to poorer performance from the Stabileze Gel at this pH. (Similar responses were obtained when using iota carrageenan (LSS-1) instead of Stabileze Gel, see Examples 12–13). The rheology of formulations containing LLS-1 was better but bleed water containing was much higher toward the end of the life. Before the pH increased above 10.0, an additional 3 to 4% boric acid could be added to extend the life for another 6 to 7 days (see Examples 11–12). In such instances, the bleed water was extremely low. Increasing the LSP-1 shortened the life and increased the bleed water (Examples 1, 2 and 3). Increasing the Boric Acid (Examples 3, 4, 5 and 6) increased the life of the product but also made the slurry thicker due to the lower pH of the system which caused the Stabileze gel to be more viscous.

Figure 2:
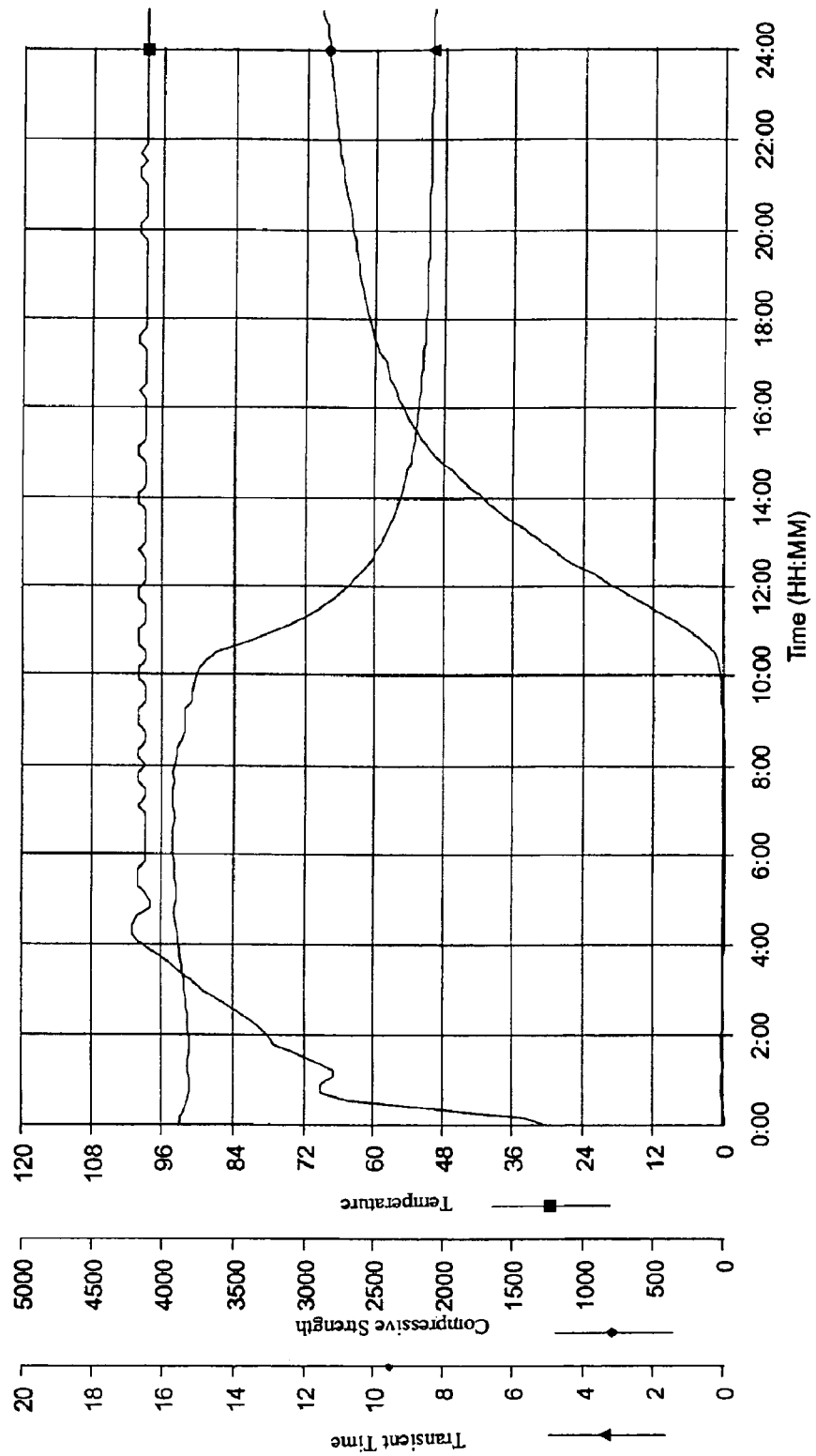
Figure 3:
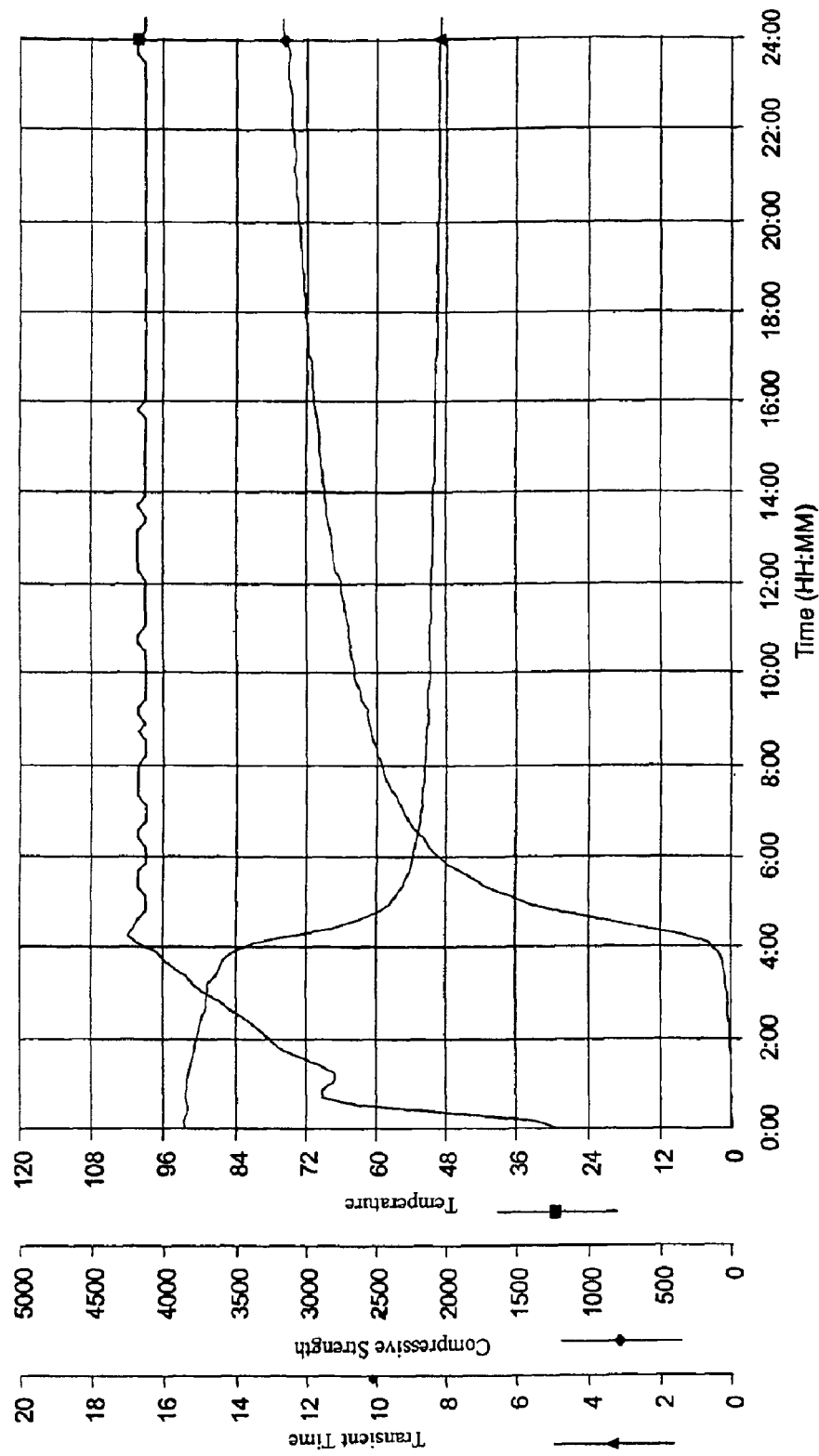
Figure 4:
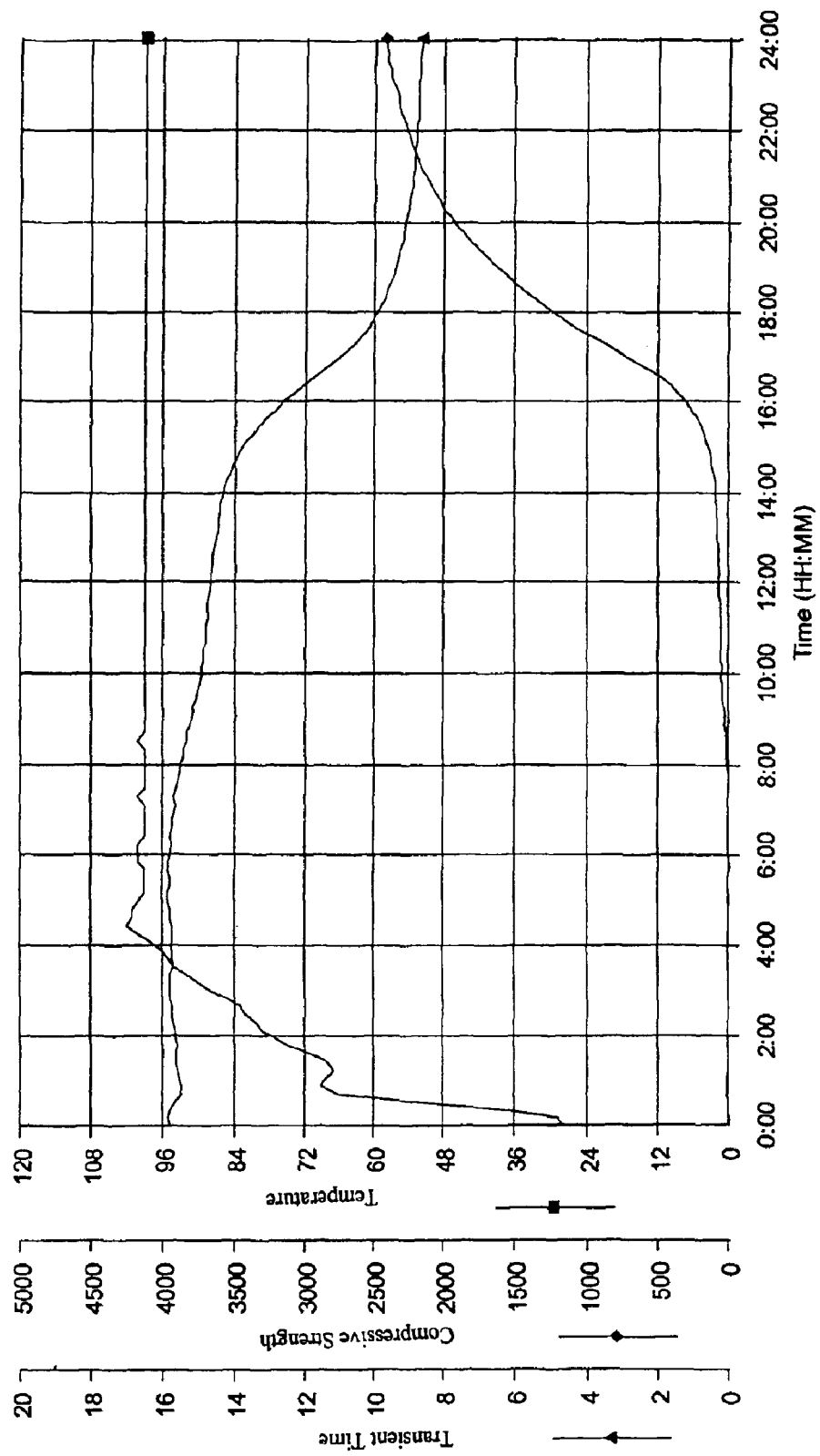

All of the formulations summarized in Table I were re-activated using a 50% solution of KF (potassium fluoride) or dibasic potassium phosphate, the concentration ranging from 0.25 gpc to 1.5 gpc, at temperatures below 100° F. The use of 1.5 gpc of activator will produce a TT of around 3 hours and a 24 hours Compressive Strength higher than 1500 psi on a 15.8 ppg formulation. At 200° F., between 0.25 to 0.5 gpc of one of the above activators will produce similar TT and higher CS. See FIGS. 1–4 where the units For Transient Time, Compressive Strength and Temperature are micro sec/in., psi, and ° C., respectively.

The term "TT" refers to the beginning of the set where slurry is no longer pumpable and Compressive Strength refers to the strength of the cement measured in PSI after 24 hours.

From the foregoing, it will be observed that numerous variations and modifications may be effected without departing from the true spirit and scope of the novel concepts of the invention.

What is claimed is:

1. A storable, hydraulically-active, cementitious slurry comprising:
   a hydraulically-active cementitious material suitable for cementing within subterranean formations for oil or gas wells;

a suspending agent; and boric acid wherein the amount of boric acid in the cementitious slurry is between from about 1 to about 6 percent by weight.

2. The storable, hydraulically-active, cementitious slurry of claim 1, wherein the suspending agent is iota carrageenan.

3. The storable, hydraulically-active, cementitious slurry of claim 1, wherein the suspending agent comprises poly (methyl vinyl ether/maleic anhydride) decadiene copolymer.

4. The storable, hydraulically-active, cementitious slurry of claim 1, wherein the hydraulically-active cementitious material is Portland cement.

5. The storable, hydraulically-active, cementitious slurry of claim 1, which further comprises a dispersing agent.

6. A storable, hydraulically-active, cementitious slurry comprising:

a hydraulically-active cementitious material suitable for cementing within subterranean formations for oil or gas wells;

a suspending agent; and boric acid wherein the amount of boric acid in the cementitious slurry is sufficient to lower the pH of the storable cementitious slurry to at least 12.0.

7. The storable, hydraulically-active, cementitious slurry of claim 6, wherein the amount of boric acid in the cementitious slurry is sufficient to lower the pH of the storable cementitious slurry to at least 11.0.

8. The storable, hydraulically-active, cementitious slurry of claim 7, wherein the slurry contains boric acid in an amount sufficient to lower the pH to at least 10.0.

9. The storable, hydraulically-active, cementitious slurry of claim 8, wherein the slurry contains boric acid in an amount sufficient to lower the pH to at least 9.0.

10. The storable, hydraulically-active, cementitious slurry of claim 9, wherein the slurry contains boric acid in an amount sufficient to lower the pH to at least 8.0.

11. The storable, hydraulically-active, cementitious slurry of claim 10, wherein the slurry contains boric acid in an amount sufficient to lower the pH to at least 7.0.

12. The storable, hydraulically-active, cementitious slurry of claim 10, wherein the slurry contains boric acid in an amount sufficient to lower the pH to at least 6.0.

13. The storable, hydraulically-active, cementitious slurry of claim 7, wherein the suspending agent is iota carrageenan.

14. The storable, hydraulically-active, cementitious slurry of claim 7, wherein the suspending agent comprises poly (methyl vinyl ether/maleic anhydride) decadiene copolymer.

15. The storable, hydraulically-active, cementitious slurry of claim 6, wherein the hydraulically-active cementitious material is Portland cement.

16. The storable, hydraulically-active, cementitious slurry of claim 7, which further comprises a dispersing agent.

17. A method of cementing within a subterranean formation for an oil or gas well, the method comprising the steps of:

formulating a storable, hydraulically-active, cementitious slurry by mixing together a hydraulically-active cementitious material of a type suitable for cementing within subterranean formations for oil or gas wells, a suspending agent and boric acid, wherein the pH of the cementitious slurry is between from about 6.0 to about 12.0;

storing the storable slurry until required for cementing;

activating the storable slurry;

pumping the activated slurry into the subterranean formation; and allowing the activated slurry to set.

18. The method of claim 17, wherein the pH of the cementitious slurry is between from about 6.0 to about 11.0.

19. The method of claim 18, wherein the pH of the cementitious slurry is between from about 7.0 to about 10.0.

20. The method of claim 18, wherein the suspending agent is iota carrageenan.

21. The method of claim 18, wherein the suspending agent comprises poly (methyl vinyl ether/maleic anhydride) decadiene copolymer.

22. The method of claim 17, wherein the hydraulically-active cementitious material is Portland cement.

23. The method of claim 18, which further comprises a dispersing agent.

24. A method of cementing within a subterranean formation for an oil or gas well, the method comprising the steps of:

formulating a storable, hydraulically-active, cementitious slurry by mixing together a hydraulically-active cementitious material of a type suitable for cementing within subterranean formations for oil or gas wells, a suspending agent and boric acid, wherein the amount of boric acid in the cementitious slurry is between from about 1.0 to about 6.0 weight percent of the cementitious slurry;

storing the storable slurry until required for cementing;

activating the storable slurry;

pumping the activated slurry into the subterranean formation; and allowing the activated slurry to set.

25. The method of claim 24, wherein the storable slurry contains boric acid in an amount sufficient to lower the pH to at least 11.0.

26. The method of claim 25, wherein the storable slurry contains boric acid in an amount sufficient to lower the pH to at least 10.0.

27. The method of claim 26, wherein the slurry contains boric acid in an amount sufficient to lower the pH to at least 9.0.

28. The method of claim 27, wherein the storable slurry contains boric acid in an amount sufficient to lower the pH to at least 8.0.

29. The method of claim 28, wherein the slurry contains boric acid in an amount sufficient to lower the pH to at least 7.0.

30. The method of claim 29, wherein the slurry contains boric acid in an amount sufficient to lower the pH to at least 6.0.

31. The method of claim 25, wherein the suspending agent is iota carrageenan.

32. The method of claim 25, wherein the slurry is activated by adding thereto an activator.

33. The method of claim 32, wherein the activator is an alkali halide, ammonium halide, KF, dibasic alkali phosphate, tribasic alkali phosphate, ammonium fluoride, tribasic ammonium phosphate, dibasic ammonium phosphate, ammonium bifluoride, sodium fluoride, a triethanolamine, an alkali silicate or an alkali carbonate.

34. The method of claim 33, wherein the activator is KF, dibasic potassium phosphate, tribasic potassium phosphate, ammonium fluoride, ammonium bifluoride, tribasic ammonium phosphate, dibasic ammonium phosphate, sodium fluoride, a triethanolamine, an alkali silicate or an alkali carbonate.

35. The method of claim 24, wherein the suspending agent comprises poly (methyl vinyl ether/maleic anhydride) decadiene copolymer.

36. The method of claim 24, wherein the hydraulically-active cementitious material is Portland cement.

37. The method of claim 24, wherein the storable slurry further comprises a dispersing agent.

38. A method of cementing within a subterranean formation for an oil or gas well, the method comprising the steps of:

formulating a storable, hydraulically-active, cementitious material by mixing together Portland cement, a suspending agent and boric acid wherein the amount of boric acid in the cementitious material is between from about 1.0 to about 6.0 weight percent;

storing the storable slurry, until required for cementing, at a pH between from about 6.0 to about 12.0;

activating the storable slurry;

pumping the activated slurry into the subterranean formation; and allowing the activated slurry to set.

39. The method of claim 38, wherein the pH of the storable slurry is between from about 6.0 to about 11.0.

* * * * *